United States Patent [19]

England et al.

[11] Patent Number: 5,219,588
[45] Date of Patent: Jun. 15, 1993

[54] DIE ASSEMBLY CONTROL

[75] Inventors: Todd A. England, North Canton; William H. Miller, Wadswroth, both of Ohio

[73] Assignee: GenCorp Inc., Fairlawn, Ohio

[21] Appl. No.: 797,636

[22] Filed: Nov. 25, 1991

Related U.S. Application Data

[63] Continuation of Ser. No. 478,373, Feb. 12, 1990, Pat. No. 5,067,885.

[51] Int. Cl.⁵ .................. B29C 47/22; B29C 47/34
[52] U.S. Cl. .................. 425/189; 264/177.1; 264/209.8; 264/339; 425/132; 425/140; 425/146; 425/185; 425/192 R; 425/377; 425/381; 425/382.3; 425/466
[58] Field of Search ............ 425/131.1, 146, 132, 425/380, 381, 464, 465, 466, 133.5, 189, 185, 140, 192 R, 377, 382.3; 264/177.1, 209.2, 209.8, 285, 339

[56] References Cited

U.S. PATENT DOCUMENTS

| | | |
|---|---|---|
| 1,618,256 | 2/1927 | Wuthrich . |
| 2,062,338 | 12/1936 | Tanzi . |
| 2,502,247 | 3/1950 | Clark . |
| 3,046,602 | 7/1962 | Houvener . |
| 3,080,608 | 3/1963 | Van Riper . |
| 3,093,860 | 3/1963 | Eilersen . |
| 3,111,714 | 11/1963 | Branscum . |
| 3,292,213 | 12/1966 | Donald et al. . |
| 3,313,003 | 4/1967 | O'Brien ............... 425/464 |
| 3,345,444 | 10/1967 | Pratt . |
| 3,346,918 | 10/1967 | Deleuze et al. . |
| 3,405,210 | 10/1968 | Heider . |
| 3,425,092 | 2/1969 | Jun Taga . |
| 3,490,113 | 1/1970 | Bulck et al. . |
| 3,564,652 | 2/1971 | Baugnies et al. . |
| 3,761,213 | 9/1973 | Wright . |
| 3,809,516 | 5/1974 | Komaki . |
| 3,809,519 | 5/1974 | Garner . |
| 3,822,777 | 7/1974 | Jepsen . |

(List continued on next page.)

FOREIGN PATENT DOCUMENTS

| | | | |
|---|---|---|---|
| 2359746 | 6/1974 | Fed. Rep. of Germany | 264/295 |
| 2921943 | 12/1980 | Fed. Rep. of Germany | 425/131.1 |
| 2395123 | 2/1979 | France | 264/573 |
| 49-5903 | 2/1974 | Japan | 425/465 |
| 51-102050 | 9/1976 | Japan | 425/462 |
| 58-220717 | 12/1983 | Japan | 425/381 |
| 59-188424 | 10/1984 | Japan | 264/209.8 |
| 62-169614 | 7/1987 | Japan | 425/132 |
| 87-02932 | 5/1987 | PCT Int'l Appl. . | |
| 87-05258 | 9/1987 | PCT Int'l Appl. | 425/131.1 |

OTHER PUBLICATIONS

Teito Rubber Advertisement-TMS Process.
Generation and Control of Curvature in Extrusion, Apr. 22, 1991.
Extrusion of Corners, Apr. 1, 1991.

Primary Examiner—Jeffery Thurlow
Assistant Examiner—Mathieu Vargot

[57] ABSTRACT

A die assembly (10) for controlling extrudate profile dimension. The die assembly includes a die block (12) having a feed passage (16) for movably supporting a diverter member (13) within the die block, and first and second die block passages (18, 20). The diverter member (13) includes a diverter passage (32) and first and second feed openings (34, 36) interconnected by the diverter passage. One of the first or second feed openings (34, 36) has a larger diameter than the other of the first or second feed openings. The diverter member (13) is movable with respect to the die block (12) for directing extrudate flow via the diverter passage (32) through the second die block passage (20), to thereby vary the profile dimension of the extrudate exiting the die block. The die block (12) additionally includes a disposal passage (22). Movement of the diverter member (13) within the die block is provided between a first position providing communication between the first and second die block passages (18, 20), and a second position providing communication between the first die block passage (18) and the disposal passage (22). A die plate (14) may be readily changed by directing extrudate flow via the disposal passage (22).

9 Claims, 2 Drawing Sheets

U.S. PATENT DOCUMENTS

| | | |
|---|---|---|
| 3,827,547 | 8/1974 | Nixon . |
| 4,025,262 | 5/1977 | Furman . |
| 4,056,591 | 11/1977 | Goettler . |
| 4,134,715 | 1/1979 | Cueto . |
| 4,219,516 | 9/1980 | Herrington, Jr. . |
| 4,257,320 | 3/1981 | Holbrook et al. . |
| 4,276,250 | 6/1981 | Satchell et al. . |
| 4,293,294 | 10/1981 | Rasmussen . |
| 4,442,131 | 4/1984 | Nagy . |
| 4,455,133 | 6/1984 | Jakob et al. . |
| 4,461,738 | 7/1984 | Russell . |
| 4,479,768 | 10/1984 | Kube et al. . |
| 4,483,812 | 11/1984 | Hahn et al. ............... 425/133.5 |
| 4,536,147 | 8/1985 | Groff . |
| 4,638,016 | 1/1987 | Zoller . |
| 4,648,821 | 3/1987 | Thulin . |
| 4,761,129 | 8/1988 | Aste et al. . |
| 4,793,786 | 12/1988 | Greenhouse et al. . |
| 4,832,960 | 5/1989 | Compagnon ............... 425/131.1 |
| 4,906,171 | 3/1990 | Miller ............... 425/131.1 |
| 4,929,167 | 5/1990 | Pepper . |
| 5,067,885 | 11/1991 | Miller ............... 425/131.1 |

DIE ASSEMBLY CONTROL

This application is a continuation of U.S. application Ser. No. 07/478,373 filed Feb. 12, 1990, now U.S. Pat. No. 5,067,885, entitled "Rapid Change Die Assembly."

TECHNICAL FIELD

The present invention relates to a die assembly for manufacturing extrudate, and specifically to a device capable of conveniently and rapidly varying the dimension of the extrudate profile being manufactured.

BACKGROUND ART

The process of extrusion comprising charging solid extrudable material, such as rubber, to a heated chamber of an extruder is well known to those of skill in the art. The material to be extruded is heated within the chamber to a flowable state and forced from the extruder by a rotatable screw mechanism. The extrudate material is formed to a desired cross-sectional profile configuration as it flows through an opening in a die assembly which is interconnected with the extruder. The extrudate material having the desired profile is then removed from the die assembly via a conventional conveyer or handling system.

The discovery of a new and improved method and apparatus for continuously manufacturing curved or bent extrusions having undistorted cross-sectional profiles, is set forth in U.S. Pat. No. 4,906,171, issued Mar. 6, 1990 to Miller (assigned to the assignee of the present application). Further innovations were also made to another apparatus for manufacturing extrudate, as set forth in co-pending U.S. patent application Ser. No. 07/478,373, now U.S. Pat. No. 5,067,885, to Miller and Stevenson (also assigned to the assignee of the present application). The invention of this application eliminated problems which had previously existed in connection with changing the profile and/or material of an extruder die assembly in order to manufacture a different profile extrusion of a different material.

Despite these important innovations, problems still exist with respect to adjustment of the dimensions of the extrudate profile to obtain extrusions having specified and desired measurements. In the event the extruded material manufactured via conventional die assemblies does not meet the desired specifications, the die plate or other aspect of the die assembly obtained. Typically, the extruder must be shut down in order to make the necessary adjustments.

DISCLOSURE OF THE INVENTION

The present invention provides a new and improved assembly for varying the dimensions of an extrudate profile while extruding. The assembly includes a die assembly for varying extrudate profile dimensions and for rapidly changing the die plate in order to manufacture extrusions having a different profile configuration. The die assembly enables manufacture of extrudate to a predetermined desired profile configuration, enables rapid adjustment of the profile dimension of the extrudate during extrusion, or "on-line", as well as convenient on-line changes of the die plate to manufacture different extrusion profile configurations.

The die assembly includes a die block and diverter member for varying the extrudate profile dimension of extrudate as it exits the die block. The die block includes a feed passage for supporting engagement with the diverter member, and first and second die block passages extending from the feed passage. The feed passage is located intermediate the first and second die block passages to enable the diverter member to vary extrudate flow from the first die block passage to the second die block passage.

The die block additionally includes a die plate surface having a die opening therein which forms an end of the second die block passage. A die plate having the desired extrusion profile configuration opening is secured to the die block engaged with the die plate surface covering the die opening.

The die block further includes a disposal passage for disposing of material during changing from one die plate to another. A disposal opening is provided in the die plate surface adjacent the die opening of the second die block passage. The disposal opening forms an end of the disposal passage which is interconnected with the feed passage. The die plate additionally includes a disposal port spaced from the extrusion profile opening and aligned with the disposal opening.

The second die block passage and disposal passage each include a central axis. The position of the second die block passage and disposal passage within the die block are such that the central axes of the passages are transverse with respect to one another.

The diverter member additionally includes a diverter passage for directing extrudate flow from the first die block passage to the second die block passage or disposal passage. A handle for rotating the diverter member about a longitudinal axis of the diverter member within the feed passage during operation of the extruder and die assembly to manufacture the extrusion is also provided. The diverter member may also be moved along its longitudinal axis in order to obtain the necessary alignment of the first and second die block passages with the diverter passage to manufacture an extrudate having the desired profile dimensions. During extrusion, a first feed opening of the diverter passage is substantially aligned with the first die block passage and a second feed opening of the diverter passage is substantially aligned with the second die block passage. The relative movement of the diverter member within the feed passage enables adjustment of the dimensions of the extrudate profile exiting the die block.

The desired extrudate profile dimensions are obtained by moving the diverter member and varying the alignment of the first die block passage and first feed opening, and of the second feed opening and the die opening of the second die block passage. As a result of the relative movement and alignment of the diverter passage with the first and second die block passages within the die block, dimensional control of the extrudate profile is obtained in the extrudate exiting the die block.

Specifically, on-line control is provided by alignment of the diverter passage with the first and second die block passages. The diverter passage has a central longitudinal axis, and is a funnel shaped passage. Due to the funnel shape of the passage, the first feed opening has a diameter which is substantially larger than the diameter of the second feed opening. Additionally, the diameter of the first feed opening diminishes along the longitudinal axis in a direction toward the second feed opening, until the diameter is the same diameter as the second feed opening.

With this funnel configuration, full alignment of the first die block passage with respect to the diverter member first feed opening is provided at all times, even during movement of the diverter member, to fully supply the diverter passage with extrudate material. However, the smaller diameter of the second feed opening, together with the movement of the diverter member positioning the second feed opening with respect to the second die block passage, changes the extrudate flow and the length of the pathways along which the extrudate flows as it enters the second die block passage and exits the die block. Such changes are selectively made by varying the alignment of the second die block passage with the second feed opening to obtain the desired extrudate profile dimensions. Alignment of the block passages and feed openings is accomplished by rotational movement of the diverter member about its central longitudinal axis, and/or vertical movement along its central longitudinal axis. By varying alignment, the length of the pathways of extrudate flow through the die plate are altered, and correspondingly change extrudate flow as the material exits the die plate opening.

When it is desired to manufacture an extrusion with a different profile from the extrusion profile opening in a first die plate, the diverter member is moved such that the first die block passage is aligned with the first feed opening and the second feed opening is aligned with the disposal passage. Movement of the diverter member within the die block using the handle rapidly diverts the extrudate flow from the second die block passage to the disposal passage, disposal opening and disposal port of the die plate.

In this disposal position, extrudate material is no longer supplied to the second die block passage and die plate extrusion profile opening, and material is extruded from the disposal passage. The die plate may then be removed and replaced with a second die plate having a desired extrusion profile opening for forming a second extrudate having a different profile configuration, and a disposal port. Once the extrudate material is diverted to the disposal passage, the pressure due to extrusion via the second die block passage is removed from the die plate, and the die plate may be readily manually removed. By providing the ability to rapidly change the dimensions of the extrudate profile, as well as the extrudate flow from the second die block passage to the disposal passage in a time as short as one second, the extruder need not be shut down to adjust the extrudate dimensions, or to change die plates.

DETAILED DESCRIPTION OF THE INVENTION

Figure 1:
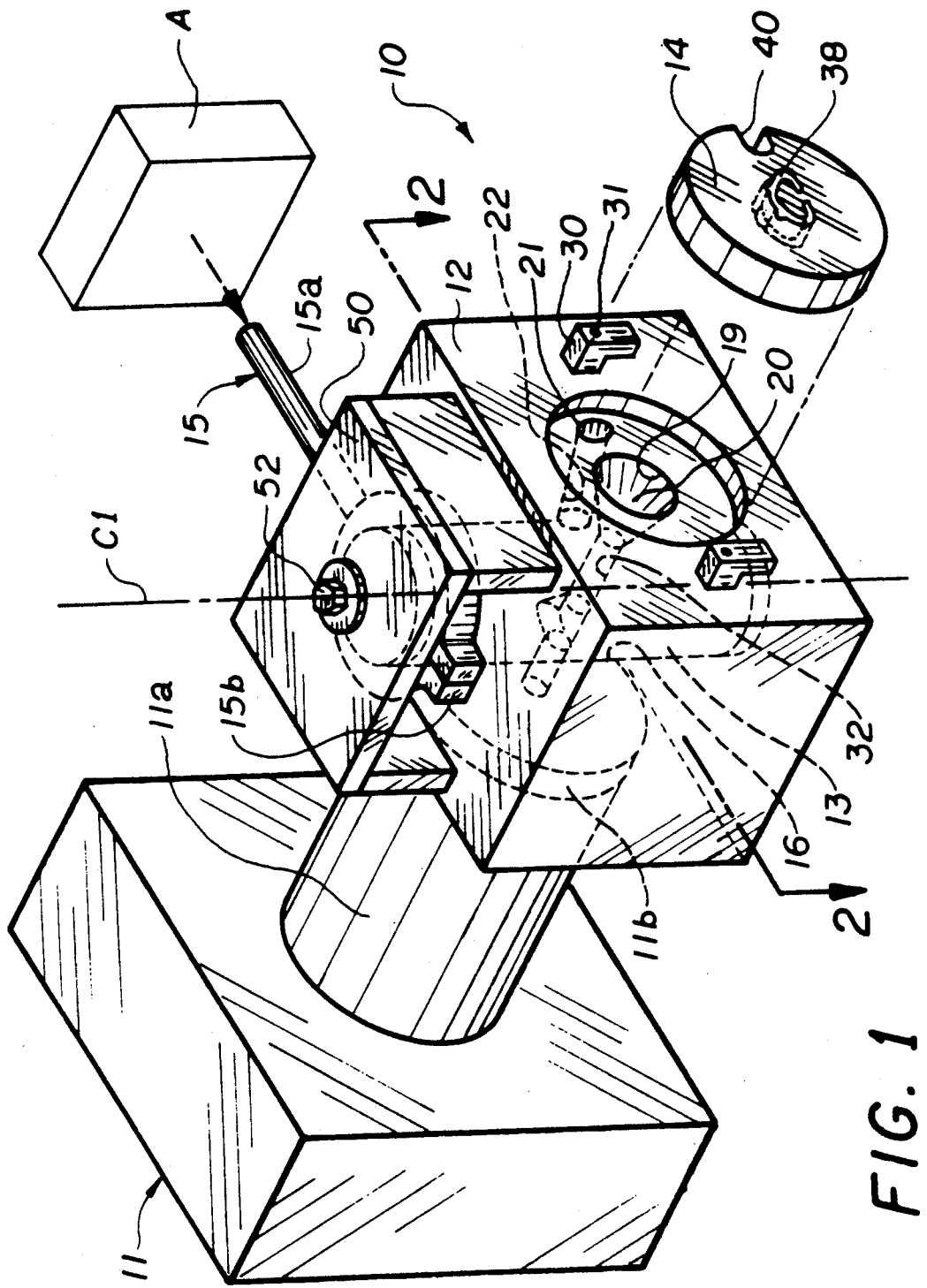
FIG. 1 is a schematic, partially exploded perspective view of an extruder die assembly of the present invention for controlling extrudate profile dimension.

A new and improved die assembly, referenced generally at 10, for varying the dimensions of an extrudate profile during the extrusion operation, is illustrated in FIG. 1. Specifically, the die assembly 10 includes a die block 12 for varying extrudate profile dimension online, and for rapidly changing a die plate for manufacturing extrusions having a different profile configuration.

In FIG. 1, an adaptor for an extruder and an extruder are schematically illustrated in conjunction with the die assembly 10. As shown, the die assembly is mounted on the extruder 11 via an extruder adaptor 11a, which are suitable and conventional devices not disclosed in detail. The extruder 11 supplies the die assembly 10 with extrudate material. As illustrated, the die assembly of the present invention is used alone, however, it should be understood that the present die assembly could be readily included with other die assemblies, for example, the rapid change die assembly provided in application Ser. No. 07/478,373, now U.S. Pat. No. 5,067,085, in order to provide on-line dimensional control of each of the multiple die portals of that assembly.

Figure 2:
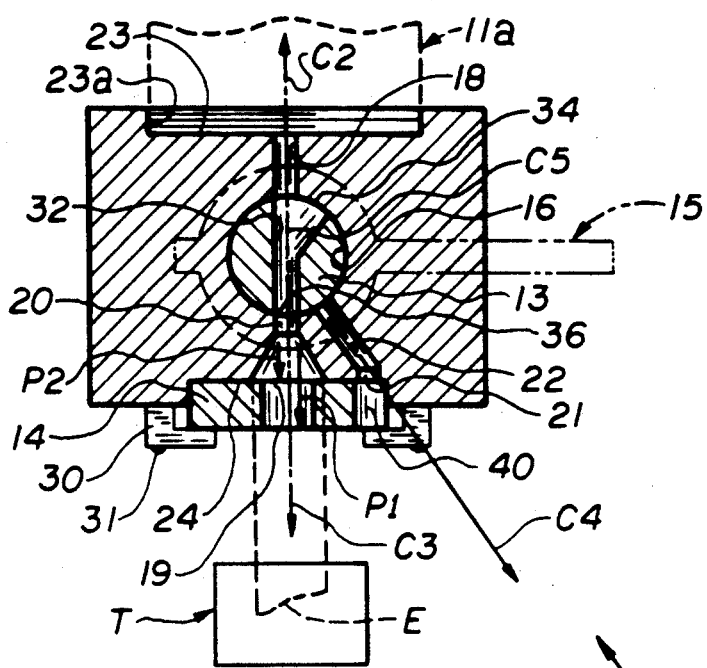
FIG. 2 is a top view of a die assembly of the present invention with the diverter member in position for extrusion, and taken along the plane 2—2 of FIG. 1.
Figure 3:
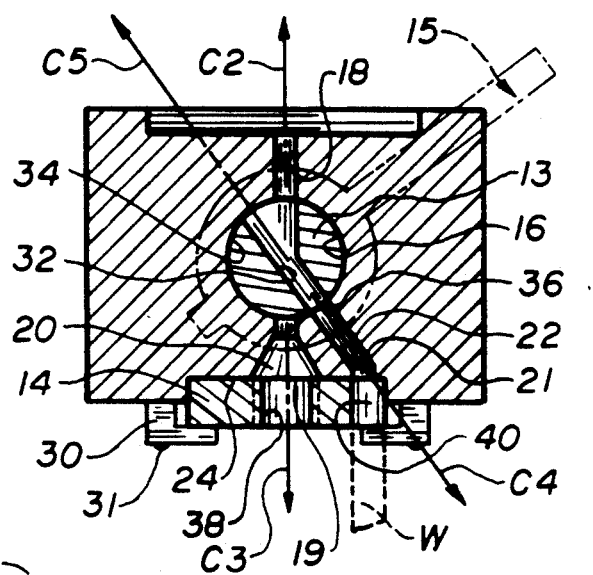
FIG. 3 is a top view of a die assembly of FIG. 2 with the diverter member in position for directing extrudate flow to a disposal passage.
Figure 4:
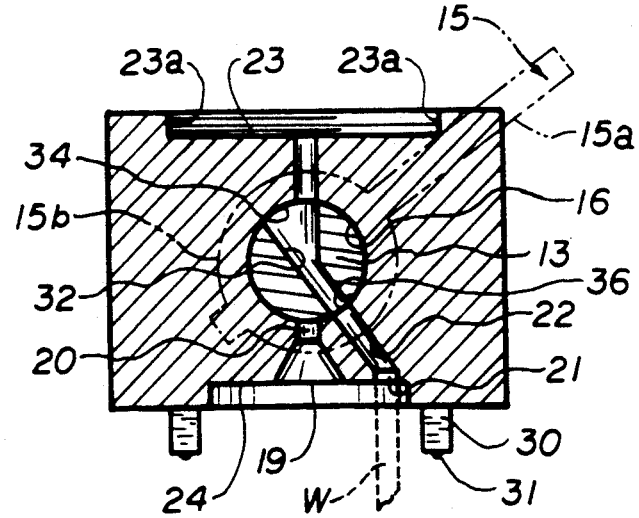
FIG. 4 is a top view of a die assembly of FIG. 2 with the diverter member in position for directing extrudate flow to the disposal passage in advance of replacement by a second die plate.

The die assembly 10 of the present invention includes a die block 12, a diverter member 13 which varies extrudate flow from the die block, a die plate 14 and a handle 15. As shown in FIGS. 2-4, the die block 12 includes a feed passage 16, first and second die block passages 18, 20, a disposal passage 22, an extruder engagement surface 23 and a die plate surface 24. The die block 12 is secured to the extruder adaptor 11a on the extruder engagement surface 23, and in the preferred and illustrated embodiment, internally threaded portions 23a of the die block are engaged with mating threaded portions 11b on extruder adaptor 11a.

As shown in the embodiment of FIGS. 1-4, the die plate 14 is secured in position with the die block 12 by conventional fasteners, such as rotatable clamps or blocks 30 secured to the die block by conventional fasteners 31. Upon engagement of the die plate 14 with the die plate surface 24, the clamps 30 are rotated to a position shown in FIGS. 2-3, to engage the die plate 14. The fasteners 31 may then be tightened to maintain the clamps 30 and die plate 14 engaged with the die block 12.

The feed passage 16 supports the diverter member 13 engaged within the die block. The first and second die block passages 18, 20 and disposal passage 22 are also provided within the die block 12 extending from the feed passage 16. The first die block passage 18 is cylindrical, and supplies extrudate from the adaptor 11a to the diverter member 13.

The second die block passage is a funnel shaped passage, and supplies extrudate material from the diverter member 13 to a die opening 19 which is formed in the die plate engagement surface 24. The second die block passage has a smaller diameter at an end of the passage in communication with the feed passage, and is larger in diameter in a direction toward the die plate engagement surface 24.

The disposal passage 22 permits extrudate to exit the die block from the diverter member 13 to a disposal opening 21 formed at the end of the disposal passage 22 engaged with the die plate engagement surface 24. In the preferred and illustrated embodiment, material extruded from the disposal opening 21 is used to connect the first extrudate to the next new extrudate, as discussed below.

The feed passage 16 is located intermediate the first die block passage 18, and the second die block passage 20 and disposal passage 22, to enable the diverter member 13 to vary extrudate flow from the first die block passage 18, to the second die block passage or disposal passage 20, 22. The feed passage, first and second die block passages and disposal passage, 16, 18, 20, 22, each include a central longitudinal axis C1, C2, C3, C4, respectively.

The diverter member 13 includes a diverter passage 32 having a first and second feed openings 34, 36, and a central longitudinal axis C5. The diverter passage is partially funnel shaped, such that the first feed opening 34 has a larger diameter than the second feed opening 36, and the diameter of the passage 32 diminishes in a direction toward the second feed opening 36, until its diameter is the same as the second feed opening.

The diverter member 13 is movably secured in axially aligned position within the die block 12 by a support platform 50. The support platform illustrated in FIG. 1 is supported on the die block 12. A conventional fastener 52 is engaged through the platform, and into engagement with the diverter member 13 along its central axis C1.

As shown in FIGS. 2-4, the first die block passage 18 and the second die block passage 20 are positioned within the die block such that their central axes C2, C3, respectively, are aligned. Additionally, the second die block passage 20 and the disposal passage 22, are positioned within the die block 12 such that their axes C3, C4, respectively, are transverse with respect to one another.

During operation of the die assembly 10, the diverter passage 32 is movable within the die block 12. The passage 32 moves between a primary extrusion position, as in FIG. 2, where the central axis C5 of the passage is substantially aligned with the central axes C2, C3 of the first and second die block passages 18, 20, and a disposal position, as in FIG. 3, where the central axis C5 is aligned with the central axis C4 of the disposal passage 22. The handle 15 moves the diverter member 13 within the feed passage 16 about the central longitudinal axis C1 between these primary extrusion and disposal positions during operation of the extruder and die assembly. The handle includes a shaft 15a and a clamp portion 15b which surrounds the diverter member 13 intermediate the support platform 50 and the die block 12. Operation of the handle may be done manually by an operator. Alternatively, the handle may be interconnected with computer controlled hydraulic, pneumatic or other actuators A.

The diverter passage 32 also moves within the primary extrusion position to obtain the desired alignment of the central axis C5 of the passage with respect to the central axes C2, C3 of the first and second die block passages 18, 20, to obtain extrusions with the specified profile dimensions. Movement of the diverter passage 32 within the primary extrusion position is provided about the longitudinal axis C1 and/or along the longitudinal axis. The handle 15 is used for desired movement about the axis, and movement along the axis is obtained by manual adjustment of the diverter member 13 using the fastener 52 engaged with the support platform 50.

The die plate 14 includes an extrusion profile configuration opening 36 which covers the die opening 19. The die plate additionally includes a disposal port 40 spaced from the profile opening 36 for alignment with the disposal opening 21.

In the primary extrusion position, and during the extrusion operation, the diverter member 13 may be selectively moved to provide any alignment position between the second feed opening 6 and the second die block passage 20. Movement of the diverter member to obtain desired dimensions in the extrudate profile is accomplished by varying the pathways P1 along which the extrudate travels from the diverter passage 32 to the profile opening 38. Varying the alignment position of the second feed opening with respect to the second die block passage, also varies the flow path length P2 from the feed opening 36 to the die opening 19. Varying these flow path lengths P1, P2 causes variations in the exit velocity of the extrudate flow E as it exits the profile opening of the die block. Results obtained by varying extrudate velocity and flow path length are set forth in parent application U.S. Ser. No. 07/478,373, now U.S. Pat. No. 5,067,885, and U.S. Pat. No. 4,906,171. Movement of the diverter passage central axis C5 out of alignment with respect to the first and second die block passage axes C2, C3, such that the diverter passage is intermediate the diverter positions shown in FIGS. 2 and 3, correspondingly changes the dimensions of the extrudate profile exiting the die block. It is understood by those of ordinary skill in the art of profile extrusion that optimal dimensional control using the present invention is obtained using a take-away system, preferably by a constant speed take-away system, as schematically illustrated in FIG. 2.

When it is desired to change to a different extrudate profile, the diverter member 13 is moved, in approximately second, to the disposal position shown in FIG. 3. In this position, extrudate flow is via the disposal passage 22, disposal opening 21 and disposal port 40. As shown in FIG. 1, the disposal passage 22 has an oval shaped cross-sectional configuration which is elongate in the direction of the axis C1 of the diverter member, and tapers outwardly in a direction toward the disposal opening 21. The extrudate W is removed from the die block during changing of the die plates 14 at disposal port 40. The tapered configuration of the disposal passage 22 to the disposal opening 21 allows for easy removal of any extrudate material remaining after the die plate change.

As the end of the first profile extrudate exits the extrusion profile opening 38, the material extruded from the disposal port 40, or waste material, is interconnected with the first profile extrudate. During the rapid changing of the die plate 14, the material extruded from the disposal opening 21 is preferably deposited to an adjacent handling system.

To remove the die plate 14 from engagement with the die plate engagement surface 24, the fasteners 31 are first loosened to rotate the single or multiple associated clamps 30 out of engagement with the die plate 14. The die plate may then be removed, either manually, or by a quick removal process. Once the diverter member 13 diverts extrudate material to the disposal passage, operating pressure is removed from the die plate, and the plate may be readily manually removed from engagement with the die plate surface 24. A second die plate having a different extrusion profile opening for forming a second profile extrudate may then be aligned in position to cover the die opening and disposal opening, respectively, engaged with the engagement surface 24. Once engaged, the clamps 30 are returned to a position engaged with the die plate, and the conventional fasteners 31 are tightened to maintain the clamps and die plate 14 during extrusion of the second extrudate.

Upon installation of the second die plate, the diverter member 13 may be moved to again permit extrudate flow via the second die block passage 20 and a die plate 14 having the second extrusion profile opening 38. As the end of the waste material W extruded from the disposal port 40 exits the die plate 14, the material E extruded from the second extrusion profile opening 38 is interconnected with the waste material. The use of the waste material W extruded from the disposal opening 21 during the rapid changing of the die plate, avoids shut down of the manufacturing line to which the extrudate material is transported. By using the waste material to interconnect the first and second profile extrusions, the later bathing, curing or other processing operations performed on the single, interconnected length of extrudate along the manufacturing line are not required to be interrupted. Typically, changing die plates requires the manufacturing line to be shut down to permit reentry or threading of the new extrudate into the manufacturing line.

It should be apparent from the foregoing that changes may be made in the details of construction and configuration without departing from the scope and content of the present invention for rapidly changing extrudate profile dimensions during the extrusion operation and changing die plates.

We claim:

1. A die assembly for controlling extrudate profile dimension during the flow of extrudate, said assembly comprising:
   a die block having a feed passage, first and second die block passages, a die opening forming an end of said second die block passage, said feed passage located intermediate said first and second die block passages, and having a central longitudinal axis,
   a diverter member supported for movement in said feed passage of said die block with respect to said feed passage central longitudinal axis,
   said diverter member having a diverter passage and first and second feed openings interconnected by said diverter passage, wherein said first feed opening is larger in diameter than said second feed opening, and
   said diverter member being movable with respect to said die block such that said first and second die block passages are in communication with said first and second feed openings, respectively, for varying extrudate flow and the length of the pathway along which the extrudate flows from said first die block passage to said second die block passage and correspondingly varying extrudate profile dimension.

2. The die assembly of claim 1 wherein said diverter member has a first extrusion position and a second extrusion position with respect to said feed passage, and in said first extrusion position said first die block passage and said first feed opening are in communication such that movement of said diverter member extrudate profile dimension.

3. The die assembly of claim 2 wherein said die block further includes a disposal passage and a disposal opening, said disposal passage for interconnecting said disposal passage and said disposal opening when said diverter member is in said second position.

4. The die assembly of claim 3 wherein said second die block passage and disposal passage each include a central axis and said central axis of said disposal passage is transverse with respect to said central axis of said second die block passage.

5. The die assembly of claim 1 or 3 further including a die plate having an extrusion profile opening and said die block further includes a die plate surface for engagement with said die plate in a position with said extrusion profile opening covering said die opening.

6. The die assembly of claim 5, wherein said die plate further includes a disposal port spaced from said extrusion profile opening, said disposal port aligned with said disposal passage and disposal opening for receiving extrude flow in said second position.

7. The die assembly of claim 1 wherein said first feed opening of said diverter passage has a larger diameter than said second feed opening of said diverter passage, and said die opening of said second die block passage has a larger diameter than said second feed opening of said diverter passage.

8. The die assembly of claim 7 wherein said diverter member includes a handle for rotating said member such that said second feed opening is movable in said first position between partial alignment of said second feed opening with said second die block passage and full alignment of said second feed opening with said second die block passage.

9. A die assembly for controlling extrudate profile dimension during the flow of extrudate, said assembly comprising:
   a die block having a feed passage, first and second die block passages, a die opening forming an end of said second die block passage, a disposal passage, said feed passage located intermediate said first and second die block passages, and having a central longitudinal axis,
   a diverter member supported for movement in said feed passage of said die block with respect to said feed passage central longitudinal axis,
   said diverter member having a diverter passage and first and second feed openings interconnected by said diverter passage, wherein said first feed opening is larger in diameter than said second feed opening,
   said diverter member being movable with respect to said die block for varying extrudate flow and the length of the pathway along which the extrudate flows from said first die block passage to said second die block passage and corresponding varying extrudate profile dimension, and
   said diverter member being movable with respect to said die block for directing extrudate flow from said first die block passage to said disposal passage.

* * * * *